(12) United States Patent
Hattori et al.

(10) Patent No.: US 10,919,271 B2
(45) Date of Patent: Feb. 16, 2021

(54) COMPOSITE MOLDED ARTICLE AND METHOD OF MANUFACTURING SAME

(71) Applicant: Toray Industries, Inc., Tokyo (JP)

(72) Inventors: Kimihiko Hattori, Nagoya (JP); Shinsuke Hidaka, Nagoya (JP); Hideo Matsuoka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 188 days.

(21) Appl. No.: 16/065,301

(22) PCT Filed: Dec. 14, 2016

(86) PCT No.: PCT/JP2016/087149
§ 371 (c)(1),
(2) Date: Jun. 22, 2018

(87) PCT Pub. No.: WO2017/110602
PCT Pub. Date: Jun. 29, 2017

(65) Prior Publication Data
US 2019/0022905 A1  Jan. 24, 2019

(30) Foreign Application Priority Data

Dec. 25, 2015 (JP) ................. 2015-253250

(51) Int. Cl.
| | | |
|---|---|---|
| *B32B 25/02* | (2006.01) | |
| *B32B 27/34* | (2006.01) | |
| *B29C 45/14* | (2006.01) | |
| *B32B 27/30* | (2006.01) | |
| *B32B 25/14* | (2006.01) | |
| *B32B 7/12* | (2006.01) | |
| *B32B 5/02* | (2006.01) | |
| *B32B 25/08* | (2006.01) | |
| *B32B 5/12* | (2006.01) | |
| *B32B 27/08* | (2006.01) | |
| *B32B 27/12* | (2006.01) | |

(52) U.S. Cl.
CPC .............. *B32B 25/02* (2013.01); *B29C 45/14* (2013.01); *B32B 5/024* (2013.01); *B32B 5/026* (2013.01); *B32B 5/12* (2013.01); *B32B 7/12* (2013.01); *B32B 25/08* (2013.01); *B32B 25/14* (2013.01); *B32B 27/08* (2013.01); *B32B 27/12* (2013.01); *B32B 27/30* (2013.01); *B32B 27/302* (2013.01); *B32B 27/34* (2013.01); *B32B 2262/0261* (2013.01); *B32B 2262/101* (2013.01); *B32B 2262/103* (2013.01); *B32B 2262/106* (2013.01); *Y10T 428/1352* (2015.01); *Y10T 428/1372* (2015.01)

(58) Field of Classification Search
CPC . B29C 45/0001; B29C 45/14; B29C 45/0005; B29C 2045/0006; B32B 27/30; B32B 25/14; B32B 7/12; B32B 25/02; B32B 5/026; B32B 5/024; B32B 25/08; B32B 5/12; B32B 27/08; B32B 27/12; B32B 27/302; B32B 27/34; B32B 2262/103; B32B 2262/0261; B32B 2262/101; B32B 2262/106; B29K 2025/08; B29K 2055/02; B29K 2077/00; B29K 2105/105; B29K 2307/04; Y10T 428/1352
See application file for complete search history.

(56) References Cited

U.S. PATENT DOCUMENTS 5,371,152 A * 12/1994 Hoyano ................. C08G 59/18
525/396
2007/0166560 A1   7/2007 Wursche et al.

FOREIGN PATENT DOCUMENTS

| JP | 6-297647 A | 10/1994 |
|---|---|---|
| JP | 9-272134 A | 10/1997 |
| JP | 11-348191 A | 12/1999 |
| JP | 2008-502758 A | 1/2008 |
| JP | 2010-253801 A | 11/2010 |
| JP | 2012-206348 A | 10/2012 |
| WO | 2014/112501 A1 | 7/2014 |

* cited by examiner

*Primary Examiner* — James C Yager
(74) *Attorney, Agent, or Firm* — DLA Piper LLP (US)

(57) ABSTRACT

A composite molded article has (A) a fiber-reinforced resin molded article (A) including a fiber-reinforced resin having a polyamide-based resin as a matrix resin, a molded article (B) including a modified vinyl-based copolymer, and a molded article (C) including a styrene-based resin layered in this order. A layer (B) including a modified vinyl-based copolymer is interposed as a joining layer between a layer (A) of a fiber-reinforced resin having a polyamide-based resin as a matrix resin and a layer (C) including a styrene-based resin, whereby a composite molded article can be obtained in which the layers (A), (B) and (C) are strongly joined and integrated, and a composite molded article can be obtained which has excellent characteristics not realizable by a single layer of the layer (A) or the layer (C).

11 Claims, No Drawings

US 10,919,271 B2

COMPOSITE MOLDED ARTICLE AND METHOD OF MANUFACTURING SAME

TECHNICAL FIELD

This disclosure relates to a composite molded article in which a fiber-reinforced resin molded article and a molded article comprising a specific resin different from the matrix resin, in particular, a styrene-based resin, are joined and integrated via a specific joining layer, and a method of manufacturing the same.

BACKGROUND

Although a fiber-reinforced resin is broadly used in various fields because it has high mechanical properties while it is light in weight, there are many cases where, by employing a structure of a fiber-reinforced resin molded article laminated with a layer of a specific resin different from a matrix resin of the fiber-reinforced resin molded article, as compared to a single layer of the fiber-reinforced resin layer or the specific resin layer, it is possible to satisfy various required performances and to improve moldability and surface properties while securing desired mechanical properties.

For example, it is known that a styrene-based resin such as an ABS resin can exhibit excellent surface properties and the like, but it is difficult to directly join a fiber-reinforced resin layer and a styrene-based resin layer and, for example, in JP 2010-253801 A, a method of manufacturing a fiber-reinforced composite material molded article is disclosed in which an end of a fiber-reinforced resin layer is mechanically held to be wrapped by a styrene-based resin layer to integrate both layers. In such a method, however, it is difficult to firmly integrate both layers over the entire surface between both layers.

Further, JP HEI 9-272134 A discloses a method in which a thermoplastic resin sheet containing reinforcing fibers is previously fixed in a mold and a thermoplastic resin is injected into the mold to integrate them. In JP HEI 9-272134 A, however, because no joining layer is interposed between both layers, in a combination of resins that do not have properties suitable for joining between the resins of both layers to be integrated as described above, it is difficult to directly join and integrate both layers.

Furthermore, WO 2014/112501 discloses a method in which a thermoplastic resin sheet containing reinforcing fibers is previously fixed in a mold and a thermoplastic resin is injected into the mold to integrate them. Although a joining layer is interposed between both layers, there is no concrete description with respect to the combination of layers, the thickness of the joining layer is not specified, and the initial properties and the properties after the evaluation of long-term durability are not sufficiently exhibited.

Accordingly, when attempting to obtain a composite molded article having a fiber-reinforced resin molded article and a molded article comprising a specific resin different from the matrix resin, in particular, a styrene-based resin, it could be helpful to provide a composite molded article joined and integrated with a high joining strength via a specific joining layer capable of exhibiting an excellent joining ability to both the fiber-reinforced resin molded article and the styrene-based resin molded article, and a method of manufacturing the same.

SUMMARY

We thus provide:

A composite molded article is layered by (A), (B) and (C) in this order:

(A) a fiber-reinforced resin molded article comprising a fiber-reinforced resin having a polyamide-based resin as a matrix resin;

(B) a molded article comprising a modified vinyl-based copolymer; and (C) a molded article comprising a styrene-based resin.

Since the modified vinyl-based copolymer in the molded article comprising a modified vinyl-based copolymer (B) interposed has a high joining suitability to both the polyamide-based resin in the fiber-reinforced resin molded article comprising a fiber-reinforced resin having a polyamide-based resin as a matrix resin (A) and the styrene-based resin in the molded article comprising a styrene-based resin (C), the molded articles layered in the order of (A), (B) and (C) are joined and integrated with a high joining strength over the entire surfaces, and the desired effect can be achieved securely.

It is preferred that the polyamide-based resin in the fiber-reinforced resin molded article (A) is a nylon 6, and the styrene-based resin of the molded article (C) is an ABS resin. As the reason being preferred, the adhesion with the molded article comprising a modified vinyl-based copolymer (B) is good, a flexural strength and a flexural modulus in a flexural evaluation are greatly improved and, further, no extreme decrease in flexural strength and flexural modulus is observed even in a flexural evaluation after a test for a heat aging resistance or a hot water resistance, and there is no problem.

It is preferred that the fiber-reinforced resin molded article (A) contains reinforcing fibers having a number average fiber length of 2 mm or more. By containing such reinforcing fibers, because the fiber-reinforced resin molded article (A) can exhibit a high mechanical strength, it becomes possible to exhibit a high mechanical strength even as a whole of the composite molded article.

In particular, if the reinforcing fibers of the fiber-reinforced resin molded article (A) are continuous fibers, it becomes possible to exhibit a particularly high mechanical strength.

Further, if the reinforcing fibers of the fiber-reinforced resin molded article (A) are continuous fibers and oriented in one direction, a composite molded article can exhibit a high mechanical strength, particularly in a specific direction in which continuous reinforcing fibers are oriented.

Further, although the reinforcing fibers of the fiber-reinforced resin molded article (A) are not particularly limited and it is possible to use carbon fibers, glass fibers, aramid fibers, or other reinforcing fibers, in particular, when it is desired to exhibit a high mechanical strength, it is preferred to contain carbon fibers.

Further, it is preferred that the modified vinyl-based copolymer (B) comprises a copolymer obtained by copolymerizing (B-1) and (B-2):

(B-1) a monomer containing an epoxy group, a glycidyl group or a carboxyl group, and (B-2) a styrene-based monomer.

By such a composition, the modified vinyl-based copolymer (B) can easily and adequately exhibit a high joining suitability to both the polyamide-based resin in the fiber-reinforced resin molded article (A) and the styrene-based resin in the molded article comprising a styrene-based resin (C), and a flexural strength and a flexural modulus in a flexural evaluation are greatly improved and, further, no extreme decrease in flexural strength and flexural modulus is observed even in a flexural evaluation after a test for a heat aging resistance or a hot water resistance.

Further, it is preferred that the (B-1) of the modified vinyl-based copolymer (B) is a monomer containing a carboxyl group. By such a composition, the modified vinyl-based copolymer (B) can easily and adequately exhibit a high joining suitability to both the polyamide-based resin in the fiber-reinforced resin molded article (A) and the styrene-based resin in the molded article comprising a styrene-based resin (C), and a flexural strength and a flexural modulus in a flexural evaluation are greatly improved and, further, no extreme decrease in flexural strength and flexural modulus is observed even in a flexural evaluation after a test for a heat aging resistance or a hot water resistance.

Further, it is also preferred that the modified vinyl-based copolymer (B) comprises a copolymer obtained by copolymerizing 0.1 to 10% by weight of an unsaturated carboxylic acid or an α,β-unsaturated carboxylic acid anhydride and 90 to 99.9% by weight in total of an aromatic vinyl-based monomer and a vinyl cyanide-based monomer. By such a composition, the modified vinyl-based copolymer (B) can easily and adequately exhibit a high joining suitability to both the polyamide-based resin in the fiber-reinforced resin molded article (A) and the styrene-based resin in the molded article comprising a styrene-based resin (C).

Further, it is preferred that the styrene-based resin (C) is at least one selected from the group consisting of acrylonitrile/butadiene/styrene copolymer (ABS resin), polystyrene (PS), high impact resistant polystyrene (HIPS), acrylonitrile/styrene copolymer (AS resin), acrylonitrile/acrylic rubber/styrene copolymer (AAS resin), acrylonitrile/ethylene-propylene-based rubber/styrene copolymer (AES resin), and methyl methacrylate/butadiene/styrene copolymer (MBS resin). Namely, by interposing the above-described modified vinyl-based copolymer (B), it becomes possible to satisfactorily join and integrate such a styrene-based resin (C) with the fiber-reinforced resin molded article (A).

Furthermore, since the molded article comprising the modified vinyl-based copolymer (B) may be one capable of serving to a strong joining between the fiber-reinforced resin molded article (A) and the styrene-based resin (B) and other characteristics such as mechanical properties and surface properties are not required to the molded article comprising the modified vinyl-based copolymer (B) itself, it may have a small thickness capable of contributing to the joining. From this viewpoint, the thickness of the modified vinyl-based copolymer (B) is preferably, for example, 10 to 100 μm.

To manufacture the composite molded article described above, a method of manufacturing a composite molded article comprises: placing a fiber-reinforced resin molded article (A) and a molded article comprising a modified vinyl-based copolymer (B) in a mold; and supplying a liquefied styrene-based resin (C) around the molded articles in the mold to insert-mold the molded articles.

In this method, as a method of supplying the styrene-based resin (C), for example, a method can be employed wherein the liquefied styrene-based resin (C) is supplied into the mold by injection molding or injection compression molding.

It is preferred that the fiber-reinforced resin molded article (A) is molded by introducing continuous fibers into an impregnation die filled with molten polyamide-based resin and pulling it out of a slit die.

Further, it is preferred that the fiber-reinforced resin molded article (A) and the molded article comprising a modified vinyl-based copolymer (B) are molded and integrated by any one of (a) a method of laminating a thin film-like modified vinyl-based copolymer (B) on at least one surface of the fiber-reinforced resin molded article (A) and melting it by heat pressing and (b) a method of applying a molten modified vinyl-based copolymer onto at least one surface of the fiber-reinforced resin molded article (A) and cooling it.

Thus, by interposing the layer comprising a modified vinyl-based copolymer (B) as the joining layer between the layer of the fiber-reinforced resin (A) having a polyamide-based resin as a matrix resin and the layer comprising a styrene-based resin (C), a composite molded article in which these layers (A), (B) and (C) are strongly joined and integrated can be obtained, and a composite molded article having excellent characteristics, which has not been able to be realized by a single layer of the layer (A) or the layer (C), can be obtained. In particular, by having the fiber-reinforced resin layer (A), it becomes possible to exhibit high mechanical properties while exerting other required characteristics as a whole of a composite molded article.

DETAILED DESCRIPTION

Hereinafter, our articles and methods will be explained in more detail together with examples thereof.

(A) a fiber-reinforced resin molded article comprising a fiber-reinforced resin having a polyamide-based resin as a matrix resin, (B) a molded article comprising a modified vinyl-based copolymer, and (C) a molded article comprising a styrene-based resin, are layered in this order. These components will be explained in detail below.

(A) Fiber-Reinforced Resin Molded Article:

A thermoplastic resin used in the fiber-reinforced resin molded article is a polyamide-based resin, and is a polymer having an amide bond, whose main raw material is an aminocarboxylic acid, a lactam or a diamine and a dicarboxylic acid (including a pair of salts thereof), in the main chain. As to concrete examples of the raw materials, as an aminocarboxylic acid, 6-aminocaproic acid, 11-aminoundecanoic acid, 12-aminododecanoic acid and the like are exemplified. As a lactam, ε-caprolactam, ω-undecanolactam, ω-laurolactam and the like are exemplified. As a diamine, tetramethylene diamine, hexamethylene diamine, undecamethylene diamine, dodecamethylene diamine and the like are exemplified. Further, as a dicarboxylic acid, adipic acid, suberic acid, sebacic acid, dodecanedioic acid and the like are exemplified. These diamine and dicarboxylic acid can also be used as a pair of salts.

As preferable examples of the polyamide-based resin, polycaproamide (nylon 6), polytetramethylene adipamide (nylon 46), polyhexamethylene adipamide (nylon 66), polycaproamide/polyhexamethylene adipamide copolymer (nylon 6/66), polyundecamide (nylon 11), polycaproamide/polyundecamide copolymer (nylon 6/11), polydodecamide (nylon 12), polycaproamide/polydodecamide copolymer (nylon 6/12), polyhexamethylene sebacamide (nylon 610), polyhexamethylene dodecamide (nylon 612), polyundecamethylene adipamide (nylon 116), and mixtures or copolymers thereof and the like are exemplified. Among them, nylon 6 is particularly preferable. Further, the polyamide-based resin may be used alone or in combination of two or more.

Next, as reinforcing fibers used in the fiber-reinforced resin molded article, inorganic fibers such as carbon fibers and glass fibers, synthetic resin fibers such as polyamide-based fibers, polyester-based fibers and aramid fibers, and metal fibers such as titanium fibers, boron fibers and stainless steel fibers are exemplified, but it is not necessarily limited thereto. The reinforcing fibers are preferably carbon fibers.

Although not particularly restricted, in one example, a skin material comprises a fiber-reinforced thermoplastic resin, it constitutes a surface layer of the structure in the finally molded form and plays a role in the strength of the structure together with a core material, and because it dominates the rigidity of the structure as a part of the surface layer, it is preferred to have a high stiffness (flexural stiffness or the like) with respect to a desired direction. For that purpose, it is preferred that the reinforcing fibers of the skin material comprise continuous fibers.

Further, as the skin material, a skin material in which reinforcing fibers are aligned in one direction and impregnated with a thermoplastic resin can be used. By using such a skin material, even if it is a relatively large-sized and large-area composite molded article, the skin material can be easily arranged at a predetermined position. Further, in this case, as the skin material, it is also possible to employ a form of a plate-like skin material laminated or knitted with a tape-like base material in which reinforcing fibers are aligned in one direction and impregnated with a thermoplastic resin. By employing such a form, even in a relatively large-sized and large-area structure, it is possible to easily arrange the skin material at a predetermined position as well as to easily impart desired mechanical properties to the skin material.

In addition, as a skin material, it is possible to employ a form containing a reinforcing fiber woven fabric. By employing such a form, it is also possible to impart a desirable design property to the surface of the composite molded article. Further, by containing the reinforcing fiber woven fabric, because it becomes also possible to further improve the mechanical properties of the skin material itself constituting the surface layer of the composite molded article, it is possible to improve the mechanical properties as a whole of the structure.

The method of producing the skin material comprising a thermoplastic resin reinforced by continuous fibers aligned in one direction is not particularly restricted and, for example, a pultrusion method of putting continuous fibers in an impregnation die filled with a molten resin and pulling the fibers out of a slit die, a powder impregnation method of sprinkling a thermoplastic resin powder onto a continuous fiber bundle and melt-pressing it, a method of arranging fibers mixed spun with continuous reinforcing fibers and thermoplastic fibers in a plate form and hot pressing it, a method of pressing resin films to upper and lower sides of continuous fibers aligned in one direction and impregnating the resin and the like can be exemplified. Among these manufacturing methods, the pultrusion method of putting continuous fibers in an impregnation die filled with a molten resin and pulling the fibers out of a slit die is preferred because the impregnation property of the molten resin into the continuous fibers is good, and the strength, the stiffness, further, the properties after tests of heat aging resistance and hot water resistance of a composite molded article become high.

(B) Modified Vinyl-Based Copolymer:

For example, the modified vinyl-based copolymer (B) is preferably a copolymer prepared by copolymerizing an unsaturated carboxylic acid or an α,β-unsaturated carboxylic anhydride at an amount of 0.1 to 10% by weight and an aromatic vinyl-based monomer and a vinyl cyanide-based monomer at a total amount of 90 to 99.9% by weight.

As the above-described unsaturated carboxylic acid group or α,β-unsaturated carboxylic acid anhydride constituting the modified vinyl-based copolymer (B), for example, unsaturated carboxylic acids such as methacrylic acid, maleic acid, fumaric acid, itaconic acid, methyl maleic acid, methyl fumaric acid and glutaconic acid, and α,β-unsaturated carboxylic acid anhydrides such as maleic anhydride, phthalic anhydride, itaconic anhydride, methyl maleic anhydride and methyl fumaric anhydride, can be exemplified. Among these, methacrylic acid, maleic acid and maleic anhydride are preferable, and methacrylic acid is more preferably used. These may be used alone or in combination of two or more.

Further, as the above-described aromatic vinyl-based monomer constituting the modified vinyl-based copolymer (B), for example, styrene, α-methyl styrene, vinyl toluene, o-ethyl styrene, p-methyl styrene, chloro styrene and bromo styrene can be exemplified and, in particular, styrene is preferably employed.

Further, as the above-described vinyl cyanide-based monomer constituting the modified vinyl-based copolymer (B), for example, acrylonitrile, methacrylonitrile, ethacrylonitrile and the like can be exemplified, and in particular, acrylonitrile is preferably employed.

The use ratio of the above-described unsaturated carboxylic acid or α,β-unsaturated carboxylic acid anhydride is preferably 0.1 to 10% by weight. Further, the monomer composition ratio of the aromatic vinyl-based monomer and the vinyl cyanide-based monomer constituting the modified vinyl-based copolymer (B) is preferably 15 to 85% by weight of the aromatic vinyl-based monomer and 15 to 85% by weight of the vinyl cyanide-based monomer.

Although there are no particular restrictions on the method of obtaining the modified vinyl-based copolymer (B), solution polymerization, suspension polymerization, emulsion polymerization, precipitation polymerization and combinations thereof can be used. There are no particular restrictions also on the method of charging the monomers, and they may be added all at once at the initial stage, and to add or prevent the composition distribution of the copolymer, the addition may be divided into several steps for the polymerization.

As the initiator used for polymerization of the modified vinyl-based copolymer, a peroxide or an azo-based compound or the like is preferably used.

As concrete examples of the peroxide, for example, benzoyl peroxide, cumene hydro peroxide, dicumyl peroxide, diisopropyl benzene hydro peroxide, t-butyl hydro peroxide, t-butyl cumyl peroxide, t-butyl peroxy acetate, t-butyl peroxy benzoate, t-butyl peroxy isopropyl carbonate, di-t-butyl peroxide, t-butyl peroctate, 1,1-bis (t-butyl peroxy) 3,3,5-trimethyl cyclohexane, 1,1-bis (t-butyl peroxy) cyclohexane, t-butyl peroxy-2-ethylhexanoate and the like can be exemplified. Among them, cumene hydro peroxide and 1,1-bis (t-butyl peroxy) 3,3,5-trimethyl cyclohexane are particularly preferably used.

Further, as concrete examples of the azo-based compound, azobis isobutyronitrile, azobis (2,4 dimethyl valeronitrile), 2-phenyl azo-2,4-dimethyl-4-methoxy valeronitrile, 2-cyano-2-propyl azoformamide, 1,1'-azobiscyclohexane-1-carbonitrile, azobis (4-methoxy-2,4-dimethyl valeronitrile), dimethyl 2,2'-azobisisobutyrate, 1-t-butylazo-1-cyanocyclohexane, 2-t-butylazo-2-cyanobutane, 2-t-butylazo-2-cyano-4-methoxy-4-methylpentane and the like can be exemplified. Among them, azobis isobutyronitrile is particularly preferably used.

When these initiators are used, they are used alone or in combination of two or more.

In carrying out the polymerization, it is also possible to use a chain transfer agent such as mercaptan or terpene for the purpose of adjusting the polymerization degree of the modified vinyl-based copolymer (B). As concrete examples of the chain transfer agent, n-octyl mercaptan, t-dodecyl mercaptan, n-dodecyl mercaptan, n-tetradecyl mercaptan, n-octadecyl mercaptan, terpinolene and the like can be exemplified. Among these, n-octyl mercaptan, t-dodecyl mercaptan and n-dodecyl mercaptan are preferably used. When these chain transfer agents are used, they are used alone or in combination of two or more.

(C) Styrene-Based Resin:

As styrene-based resin (C), in addition to homopolymer of a styrene-based monomer and, as needed, a styrene-based resin obtained by polymerization of the styrene-based monomer and one or more components selected from other vinyl monomers and rubbery polymers copolymerizable therewith, can be exemplified.

As the styrene-based monomer used for the above-described styrene-based resin component (C), styrene and styrene derivatives such as a-methyl styrene, o-methyl styrene, p-methyl styrene, vinyl xylene, ethyl styrene, dimethyl styrene, p-tert-butyl styrene, vinyl naphthalene, methoxy styrene, monobromo styrene, dibromo styrene, fluoro styrene and tribromo styrene can be exemplified, and styrene is particularly preferable. They may be used alone or in combination of two or more.

As other vinyl monomers copolymerizable with the above-described styrene-based monomer, vinyl cyanide compounds such as acrylonitrile and methacrylonitrile, aryl esters of acrylic acid such as phenyl acrylate and benzyl acrylate, alkyl acrylate esters such as methyl acrylate, ethyl acrylate, propyl acrylate, butyl acrylate, amyl acrylate, hexyl acrylate, 2-ethylhexyl acrylate, octyl acrylate, cyclohexyl acrylate and dodecyl acrylate, aryl methacrylate esters such as phenyl methacrylate and benzyl methacrylate, methacrylic acid alkyl esters such as methyl methacrylate, ethyl methacrylate, propyl methacrylate, butyl methacrylate, amyl methacrylate, hexyl methacrylate, 2-ethylhexyl methacrylate, octyl methacrylate, cyclohexyl methacrylate and dodecyl methacrylate, epoxy group-containing methacrylic acid esters such as glycidyl methacrylate, maleimide-based monomers such as maleimide, N-methyl maleimide and N-phenyl maleimide, and α,β-unsaturated carboxylic acids such as acrylic acid, methacrylic acid, maleic acid, maleic anhydride, phthalic acid and itaconic acid and anhydrides thereof, can be exemplified.

As the above-described rubbery polymers copolymerizable with the styrene monomer, polybutadiene, polyisoprene, random copolymer and block copolymer of styrene/butadiene, acrylonitrile/butadiene copolymer, copolymer of acrylic acid alkyl ester or methacrylic acid alkyl ester and butadiene, diene type copolymers such as butadiene/isoprene copolymer, ethylene/propylene random copolymer and block copolymer, copolymer of ethylene and α-olefin such as random and block copolymers of ethylene/butene, copolymer of ethylene and unsaturated carboxylic acid ester such as ethylene/methyl methacrylate copolymer and ethylene/butyl acrylate copolymer, copolymer of ethylene and aliphatic vinyl such as ethylene/vinyl acetate copolymer, nonconjugated diene terpolymer of ethylene and propylene such as ethylene/propylene/hexadiene copolymer, acrylic-based rubber such as butyl polyacrylate, composite rubber having a structure in which polyorganosiloxane rubber component and polyalkyl(meth)acrylate rubber component are mutually entangled with each other so that they cannot be separated from each other and the like, can be exemplified.

As such a styrene-based resin (C), for example, polystyrene, styrene/butadiene/styrene copolymer (SBS), high impact-resistance polystyrene (HIPS), acrylonitrile/styrene copolymer (AS resin), acrylonitrile/butadiene/styrene copolymer (ABS resin), methyl methacrylate/butadiene/styrene copolymer (MBS resin), methyl methacrylate/acrylonitrile/butadiene/styrene copolymer (MABS resin), acrylonitrile/acrylic rubber/styrene copolymer (AAS resin), acrylonitrile/ethylene propylene rubber/styrene copolymer (AES resin), styrene/IPN type rubber copolymer, and a mixture thereof, can be exemplified.

Further, as the rubbery polymer copolymerizable with a styrene-based monomer, a polymer, which is composed of polybutadiene or polyisoprene and the unsaturated bond thereof is hydrogenated, can also be exemplified, and as concrete examples, hydrogenated styrene/butadiene/styrene copolymer (hydrogenated SBS) and hydrogenated styrene/isoprene/styrene copolymer (SEPS) can be exemplified.

Such a styrene-based resin may be one having a high stereo regularity such as syndiotactic polystyrene by using a catalyst such as a metallocene catalyst at the time of production thereof. Further, it is also possible to use polymers and copolymers having narrow molecular weight distribution, block copolymers, and polymers and copolymers having high stereo regularity obtained by methods such as anion living polymerization or a radical living polymerization. These can also be used alone or in combination of two or more.

Among them, it is preferred to use one or a mixture of two or more selected from the group consisting of polystyrene (PS), high impact-resistance polystyrene (HIPS), acrylonitrile/styrene copolymer (AS resin), acrylonitrile/butadiene/styrene copolymer (ABS resin), acrylonitrile/acrylic rubber/styrene copolymer (AAS resin), acrylonitrile/ethylene propylene rubber/styrene copolymer (AES resin) and methyl methacrylate/butadiene/styrene copolymer (MBS resin), and among them, ABS resin, AAS resin and AES resin are more preferable, and ABS resin is most preferable.

The ABS resin is a mixture of a thermoplastic graft copolymer, obtained by graft polymerizing a vinyl cyanide compound and an aromatic vinyl compound to a diene-based rubber component, and a copolymer of a vinyl cyanide compound and an aromatic vinyl compound. As the diene-based rubber component forming the ABS resin, for example, a rubber having a glass transition temperature of 10° C. or lower such as polybutadiene, polyisoprene, or styrene-butadiene copolymer is used, and the rate thereof is preferably 5 to 80% by weight in 100% by weight of the ABS resin component, particularly preferably, 10 to 50% by weight. As the vinyl cyanide compound to be grafted to the diene-based rubber component, those aforementioned can be exemplified and, in particular, acrylonitrile can be preferably used. Further, as the aromatic vinyl compound to be grafted to the diene-based rubber component, similarly those aforementioned can be used and, in particular, styrene and a-methyl styrene can be preferably used. The rate of such a component grafted to the diene-based rubber component is preferably 95 to 20% by weight, particularly preferably 50 to 90% by weight, in 100% by weight of the ABS resin component. Further, it is preferred that the content of the vinyl cyanide compound is 5 to 50% by weight and the content of the aromatic vinyl compound is 95 to 50% by weight relative to 100% by weight of the total amount of the vinyl cyanide compound and the aromatic vinyl compound. Further, methyl(meth)acrylate, ethyl acrylate, maleic anhydride, N-substituted maleimide and the like can also be mixed and used for a part of the above-described components grafted to the diene-based rubber component, and the content thereof is preferably 15% by weight or less. Furthermore, with respect to the initiator, chain transfer agent, emulsifier or the like used in the reaction, various ones conventionally known can be used as needed.

First, it is manufactured in the form of a molded article comprising a fiber-reinforced resin molded article (A)+a modified vinyl-based copolymer (B), and thereto, a molded article comprising a styrene-based molded article (C) can be laminated to manufacture a composite molded article. In this case, as the method of producing a molded article comprising the fiber-reinforced resin molded article (A)+the modified vinyl-based copolymer (B), the following methods are exemplified.
(i) (B) is laminated to (A), and they are molten and integrated by heat press.
(ii) Molten (B) is applied to the surface of (A) in the process of producing (A), and they are cooled.
(iii) (A) and (B) are co-extruded, and they are discharged and cooled at a state of being integrated.

Among them, the methods of (i) and (ii) are preferred from the viewpoint that the adhesion is good, the flexural strength and the flexural modulus in the flexural evaluation are greatly improved and, further, no extreme decrease is observed also in the flexural strength and the flexural modulus in the flexural evaluation after tests of heat aging resistance and hot water resistance.

Further, as the method of producing {(A)+(B)}+styrene-based resin (C), the following methods are exemplified.
(i) (A)+(B) integrated sheet or independent sheets (A) and (B) are thermally welded at the time of injection molding of (C).
(ii) First, (C) is injection-molded, and then, an integrated sheet of (A)+(B) is thermally welded to be integrated thereto.

In this case, there are various thermal welding methods such as laser, hot plate, infrared ray, friction stirring, ultrasonic wave, vibration, spin, microwave, electromagnetic induction and the like, but it is not limited thereto.

EXAMPLES

Hereinafter, examples and comparative examples will be explained. First, methods of determining properties used in the examples and comparative examples will be explained.
(1) Flexural Evaluation:
A strip-shaped test piece of 10 mm×150 mm×3.0 mm was cut out, and the strip-shaped test piece was pressed and bent under a span distance of 80 mm at a bending speed of 2 mm/min. Measurement was carried out with n=3, and flexural strength and flexural modulus were determined as a reinforcement effect.
(2) Heat Aging Resistance Test:
The strip-shaped test piece for the flexural evaluation was placed in a hot air oven (supplied by Tabai Corporation) under an atmosphere of 80° C., after 500 hours, it was taken out and left in an atmosphere of 23° C. and 50% RH for 24 hours and, then, flexural strength and flexural modulus were determined.
(3) Hot Water Resistance Evaluation:
The strip-shaped test piece for the flexural evaluation was immersed in hot water at 50° C., taken out after 500 hours, and after moisture was removed, it was left in an atmosphere of 23° C. and 50% RH for 24 hours and, then, flexural strength and flexural modulus were determined.

Production Method of Each Composition

Production Example 1: Preparation of (A) Fiber-Reinforced Resin Molded Article (A-1)

Carbon fibers "TORAYCA" (registered trademark) T700S (12K) supplied by Toray Industries, Inc. were aligned and placed in an impregnation die filled with nylon 6 resin and, then, a skin material A-1 having a content of continuous fibers of 50% by weight and having a width of 50 mm and a thickness of 0.28 mm was obtained by drawing molding.
Preparation of (A) Fiber-Reinforced Resin Molded Article (A-2):
A fiber-reinforced resin molded article (A-2) with the same fiber content was produced by a film method in which a nylon 6 resin film was melt-pressed on a continuous fiber bundle of carbon fibers "TORAYCA" (registered trademark) T700S (12K) supplied by Toray Industries, Inc.

Production Example 2: Preparation of (B) a Molded Article Comprising a Modified Vinyl-Based Copolymer (B-1)

80 parts by weight of acrylamide, 20 parts by weight of methyl methacrylate, 0.3 part by weight of potassium persulfate and 1,500 parts by weight of ion exchanged water were charged into a reactor of a stainless steel autoclave having a capacity of 20 liters and equipped with baffle and Faudler type stirring blades, and the gaseous phase in the reactor was replaced with nitrogen gas and it was kept at 70° C., while being well stirred. The reaction was continued until the monomer was completely converted into a polymer and it was obtained as an aqueous solution of a binary copolymer of acrylamide and methyl methacrylate. It was diluted with ion exchanged water to obtain a solution dissolving 0.05 part of methyl methacrylate/acrylamide copolymer in 165 parts of ion exchanged water. This was stirred at 400 rpm, and the interior of the system was replaced with nitrogen gas. Next, the following mixed materials were added while stirring the reaction system, and the temperature was elevated to 60° C. to initiate suspension polymerization.
Styrene: 70 parts by weight
Acrylonitrile: 25 parts by weight
Methacrylic acid: 5 parts by weight
t-dodecyl mercaptan: 0.25 part by weight
2,2'-azobisisobutyronitrile: 0.4 part by weight
After the reaction temperature was elevated to 65° C. for 15 minutes, the temperature was elevated up to 90° C. for 120 minutes, and the temperature was kept for 120 minutes to complete the polymerization. Subsequently, the polymer was separated, washed, and dried to obtain a modified vinyl-based copolymer (b-1) in the form of beads. The modified vinyl-based copolymer (b-1) was adjusted at 0.4 g/100 ml (methyl ethyl ketone, 30° C.) and the intrinsic viscosity measured at 30° C. using an Ubbelohde viscometer was 0.64 dl/g.

Next, the obtained modified vinyl-based copolymer (b-1) was pelletized and charged into an extruder at a temperature of 200° C., and the extruded modified vinyl-based copolymer (b-1) cooled and solidified on a cooling drum to form a film having a thickness of 100 μm, and thus, a molded article comprising a modified vinyl-based copolymer (B-1) was prepared.

(B) Preparation of molded articles comprising modified vinyl-based copolymers (B-2) to (B-4):

Molded articles (B-2) to (B-4) comprising modified vinyl-based copolymers (b-2) to (b-4) were similarly prepared in the Production Example 2 other than conditions where compositions of monomers used for suspension polymerization were changed as shown in Table 1.

Preparation of Molded Article Comprising Modified Vinyl-Based Copolymer (B-5):

A molded article (B-5) was similarly prepared in the Production Example 2 other than a condition where the composition of a monomer was changed to 74.5 parts by weight of styrene, 25 parts by weight of acrylonitrile and 0.5 part by weight of glycidyl methacrylate.

As a molded article comprising a modified vinyl-based copolymer (B-6), DYLARK D 322 (supplied by NOVA CHEMICAL JAPAN CORPORATION) was used.

(C) As the styrene-based resin, the following two kinds of resins were used.

(C-1) 355-X01 (non-reinforced. ABS resin, supplied by Toray Industries, Inc.)

(C-2) 100-G30 (glass fiber reinforced ABS resin, supplied by Toray Industries, Inc.)

Manufacturing Method of Composite Molded Article (B) modified vinyl-based copolymer (B-1) was superimposed on (A) fiber-reinforced resin molded article (A-1), and pressed at 240° C. in a press molding machine, and a sheet material integrated with (A) and (B) was obtained. Further, the sheet material integrated with (A) and (B) was set into the movable and stationary side cavities of the mold such that (A) contacted the mold surface, and (C) styrene-based resin (C-1: 355-X01) was injection-molded at a cylinder temperature of 260° C. and a mold temperature of 80° C. to obtain a different-material composite molded article having a size of 100×150×3 mm.

Example 1

Using (B) modified vinyl-based copolymer (B-1) for (A) fiber-reinforced resin molded article (A-1), the respective sheets were superimposed, and they were pressed at 240° C. in a press molding machine to obtain a sheet material integrated with (A-1) and (B-1). Further, the sheet material integrated with (A-1) and (B-1) was set into the movable and stationary side cavities of the mold such that (A-1) contacted the mold surface, and the styrene-based resin (C-1) was injection-molded at a cylinder temperature of 260° C. and a mold temperature of 80° C. to obtain a different-material composite molded article having a size of 100×150×3 mm.

Examples 2 to 3

A different-material composite molded article was obtained in the same manner as in Example 1 other than a condition where the modified vinyl-based copolymer used in Example 1 was changed as shown in Table 2.

Example 4

A different-material composite molded article was obtained by injection molding in the same manner as in Example 1 other than a condition where, in the different-material composite molded article described in Example 1, the mold temperature during injection molding was changed from 80° C. to 100° C.

Example 5

A different-material composite molded article was obtained by injection molding in the same manner as in Example 4 other than a condition where, in the different-material composite molded article described in Example 4, the respective sheet materials were set into the movable and stationary side cavities of the mold at a state where (A-1) and (B-1) were not integrated such that (A-1) contacted the mold surface.

Example 6

A different-material composite molded article was obtained by injection molding in the same manner as in Example 1 other than a condition where, in the different-material composite molded article described in Example 1, the mold temperature during injection molding was changed from 80° C. to 60° C.

Examples 7 to 9

In Example 7, a different-material composite molded article was obtained by injection molding in the same manner as in Example 1 other than a condition where (C-1) was used as the styrene-based resin (C). In Examples 8 and 9, different-material composite molded articles were obtained by injection molding in the same manner as in Example 1 other than conditions where (C-2) was used as the styrene-based resin (C), and the modified vinyl-based copolymers (B) were changed to ones shown in Table 2.

Example 10

In Example 10, a different-material composite molded article was obtained by injection molding in the same manner as in Example 1 other than a condition where the modified vinyl-based copolymer (B) was changed to (B-5) and (C-1) was used as the styrene-based resin (C) as shown in Table 2.

Example 11

In Example 11, a different-material composite molded article was obtained by injection molding in the same manner as in Example 1 other than a condition where the modified vinyl-based copolymer (B) was changed to (B-6) and (C-1) was used as the styrene-based resin (C) as shown in Table 2.

Examples 12 to 14

Different-material composite molded articles were obtained by injection molding in the same manner as in Example 1 other than conditions where, in Examples 1 to 3, (A) fiber-reinforced resin molded article was changed from (A-1) to (A-2).

Comparative Example 1

As shown in Table 3, the fiber-reinforced resin molded article (A-1) was set on the cavity surface of the mold, and the (C) styrene-based resin (C-1) was injection-molded at a cylinder temperature of 260° C. and a mold temperature of 80° C. to obtain a different-material composite molded article having a size of 100×150×3 mm.

Comparative Example 2

A composite molded article was obtained by injection molding in the same manner as in Example 1 other than a condition where, in Example 1, a modified vinyl-based copolymer (B-4) was used.

Comparative Example 3

A composite molded article was obtained by injection molding in the same manner as in Comparative Example 2 other than a condition where, in Comparative Example 2, the mold temperature during injection molding was changed from 80° C. to 100° C.

Comparative Example 4

A molded article was obtained by injection molding of (C) styrene-based resin (C-1) alone.

The property evaluation results of respective composite molded articles obtained with the compositions shown in Tables 2 and 3 are shown in Tables 4 and 5. In all of Examples 1 to 14, when (B-1) to (B-3) were interposed as joining layers, in all cases, the adhesion was good, and the effect of improving flexural strength and flexural modulus in flexural evaluation was great. Further, we found that there was no problem because an extreme decrease in flexural strength and flexural modulus even in the flexural evaluation after tests of heat aging resistance and hot water resistance was not observed.

On the other hand, in Comparative Example 1, adhesion was very poor, peeling occurred immediately after molding, and it was impossible to evaluate flexural strength and flexural modulus in flexural evaluation. Also in Comparative Examples 2 and 3, adhesion was not sufficiently improved, and the effect of improving the flexural strength and the flexural modulus was poor at the initial stage evaluation, and also in the flexural evaluation after the heat aging resistance test and the hot water resistance test, we found that the flexural strength and the flexural modulus were lowered. Further, in the single material of (C-1) alone of Comparative Example 4, the initial flexural strength and flexural modulus were low, and we found that the properties were retained even after the tests of heat aging resistance test and hot water resistance.

TABLE 1

|  |  | b-1 | b-2 | b-3 | b-4 |
|---|---|---|---|---|---|
| styrene | parts by weight | 74 | 70 | 60 | 75 |
| acrylonitrile | parts by weight | 25 | 25 | 20 | 25 |
| methacrylic acid | parts by weight | 1 | 5 | 20 | 0 |
| glycidyl methacrylate | parts by weight | 0 | 0 | 0 | 0 |

TABLE 2

| | | | Example 1 | Example 2 | Example 3 | Example 4 | Example 5 | Example 6 | Example 7 |
|---|---|---|---|---|---|---|---|---|---|
| Material | (A) fiber-reinforced resin molded article | — | — | A-1 | A-1 | A-1 | A-1 | A-1 | A-1 | A-1 |
| | (B) modified vinyl-based copolymer | — | — | B-1 | B-2 | B-3 | B-2 | B-2 | B-2 | B-1 |
| | (B)' vinyl-based copolymer | — | — | — | — | — | — | — | — | — |
| | (C) styrene-based resin | — | — | C-1 | C-1 | C-1 | C-1 | C-1 | C-1 | C-2 |
| Joining conditions | Joining method of (A) and (B) | — | — | press | press | press | press | — | press | press |
| | Press setting temperature | ° C. | | 240 | 240 | 240 | 240 | 240 | 240 | 240 |
| | Joining method of (A) + (B) and (C) | — | | injection | injection | injection | injection | injection | injection | injection |
| | Injection cylinder setting temperature | ° C. | | 260 | 260 | 260 | 260 | 260 | 260 | 260 |
| | Mold setting temperature | ° C. | | 80 | 80 | 80 | 100 | 100 | 60 | 80 |
| | Time | s | | 20 | 20 | 20 | 20 | 20 | 20 | 20 |
| | Pressure | MPa | | 40 | 40 | 40 | 40 | 40 | 40 | 40 |

| | | | Example 8 | Example 9 | Example 10 | Example 11 | Example 12 | Example 13 | Example 14 |
|---|---|---|---|---|---|---|---|---|---|
| Material | (A) fiber-reinforced resin molded article | — | A-1 | A-1 | A-1 | A-1 | A-2 | A-2 | A-2 |
| | (B) modified vinyl-based copolymer | — | B-2 | B-3 | B-5 | B-6 | B-1 | B-2 | B-3 |
| | (B)' vinyl-based copolymer | — | — | — | — | — | — | — | — |
| | (C) styrene-based resin | — | C-2 | C-2 | C-1 | C-1 | C-1 | C-1 | C-1 |
| Joining conditions | Joining method of (A) and (B) | — | press | press | press | press | press | press | press |
| | Press setting temperature | ° C. | 240 | 240 | 240 | 240 | 240 | 240 | 240 |
| | Joining method of (A) + (B) and (C) | — | injection | injection | injection | injection | injection | injection | injection |
| | Injection cylinder setting temperature | ° C. | 260 | 260 | 260 | 260 | 260 | 260 | 260 |
| | Mold setting temperature | ° C. | 80 | 80 | 80 | 80 | 80 | 80 | 80 |
| | Time | s | 20 | 20 | 20 | 20 | 20 | 20 | 20 |
| | Pressure | MPa | 40 | 40 | 40 | 40 | 40 | 40 | 40 |

TABLE 3

| | | | Comparative Example 1 | Comparative Example 2 | Comparative Example 3 | Comparative Example 4 |
|---|---|---|---|---|---|---|
| Material | (A) fiber-reinforced resin molded article | — | A-1 | A-1 | A-1 | — |
| | (B) modified vinyl-based copolymer | — | — | — | — | — |
| | (B)' vinyl-based copolymer | — | — | B-4 | B-4 | — |
| | (C) styrene-based resin | — | C-1 | C-1 | C-1 | C-1 |
| Joining conditions | Joining method of (A) and (B) | — | — | press | press | — |
| | Press setting temperature | ° C. | — | 240 | 240 | — |
| | Joining method of (A) + (B) and (C) | — | injection | injection | injection | injection |
| | Injection cylinder setting temperature | ° C. | 260 | 260 | 260 | 260 |
| | Mold setting temperature | ° C. | 80 | 80 | 100 | 100 |
| | Time | s | 20 | 20 | 20 | 20 |
| | Pressure | MPa | 33 | 33 | 33 | 33 |

TABLE 4

|  |  |  |  | Example 1 | Example 2 | Example 3 | Example 4 | Example 5 | Example 6 | Example 7 |
|---|---|---|---|---|---|---|---|---|---|---|
|  | Initial | Flexural strength | MPa | 420 | 450 | 420 | 445 | 420 | 380 | 440 |
|  |  | Flexural modulus | GPa | 41 | 42 | 41 | 41 | 35 | 40 | 42 |
| Long term | Heat aging resistance 80° C. × 500 h | Flexural strength | MPa | 410 | 440 | 380 | 438 | 401 | 350 | 430 |
|  |  | Flexural modulus | GPa | 40 | 40 | 41 | 40 | 32 | 38 | 40 |
|  | Hot water resistance 40° C. × 500 h | Flexural strength | MPa | 400 | 440 | 380 | 435 | 387 | 350 | 420 |
|  |  | Flexural modulus | GPa | 40 | 40 | 40 | 40 | 30 | 38 | 40 |

|  |  |  |  | Example 8 | Example 9 | Example 10 | Example 11 | Example 12 | Example 13 | Example 14 |
|---|---|---|---|---|---|---|---|---|---|---|
|  | Initial | Flexural strength | MPa | 460 | 440 | 250 | 420 | 340 | 360 | 340 |
|  |  | Flexural modulus | GPa | 42 | 42 | 42 | 44 | 34 | 35 | 33 |
| Long term | Heat aging resistance 80° C. × 500 h | Flexural strength | MPa | 450 | 400 | 245 | 400 | 300 | 310 | 295 |
|  |  | Flexural modulus | GPa | 41 | 42 | 40 | 43 | 28 | 30 | 27 |
|  | Hot water resistance 40° C. × 500 h | Flexural strength | MPa | 450 | 400 | 245 | 385 | 290 | 305 | 290 |
|  |  | Flexural modulus | GPa | 41 | 41 | 40 | 42 | 26 | 28 | 25 |

TABLE 5

|  |  |  |  | Comparative Example 1 | Comparative Example 2 | Comparative Example 3 | Comparative Example 4 |
|---|---|---|---|---|---|---|---|
|  | Initial | Flexural strength | MPa | impossible to determine because of not joined | 160 | 192 | 60 |
|  |  | Flexural modulus | GPa |  | 34 | 36 | 2 |
| Long term | Heat aging resistance 80° C. × 500 h | Flexural strength | MPa | impossible to determine because of not joined | 140 | 157 | 58 |
|  |  | Flexural modulus | GPa |  | 23 | 26 | 2 |
|  | Hot water resistance 40° C. × 500 h | Flexural strength | MPa | impossible to determine because of not joined | 128 | 139 | 58 |
|  |  | Flexural modulus | GPa |  | 21 | 23 | 2 |

INDUSTRIAL APPLICABILITY

A composite molded article joins and integrates a fiber-reinforced resin molded article and a molded article comprising a styrene-based resin via a joining layer.

The invention claimed is:

1. A composite molded article layered with (A), (B) and (C) in this order:
   (A) a fiber-reinforced resin molded article comprising a fiber-reinforced resin having a polyamide-based resin as a matrix resin;
   (B) a molded article comprising a modified vinyl-based copolymer; and
   (C) a molded article comprising a styrene-based resin,
   wherein the modified vinyl-based copolymer of the molded article (B) comprises a copolymer obtained by copolymerizing 0.1 to 10% by weight of an unsaturated carboxylic acid and 90 to 99.9% by weight in total of an aromatic vinyl-based monomer and a vinyl cyanide-based monomer.

2. The composite molded article according to claim 1, wherein the polyimide-based resin in the fiber-reinforced resin molded article (A) is a nylon 6, and the styrene-based resin of the molded article (C) is an ABS resin.

3. The composite molded article according to claim 1, wherein the fiber-reinforced resin molded article (A) contains reinforcing fibers having a number average fiber length of 2 mm or more.

4. The composite molded article according to claim 1, wherein reinforcing fibers of the fiber-reinforced resin molded article (A) are continuous fibers.

5. The composite molded article according to claim 1, wherein reinforcing fibers of the fiber-reinforced resin molded article (A) are continuous fibers and oriented in one direction.

6. The composite molded article according to claim 1, wherein reinforcing fibers of the fiber-reinforced resin molded article (A) include carbon fibers.

7. The composite molded article according to claim 1, wherein the molded article (B) has a thickness of 10 to 100 μm.

8. The composite molded article according to claim 2, wherein the fiber-reinforced resin molded article (A) contains reinforcing fibers having a number average fiber length of 2 mm or more.

9. The composite molded article according to claim 2, wherein reinforcing fibers of the fiber-reinforced resin molded article (A) are continuous fibers.

10. The composite molded article according to claim 3, wherein reinforcing fibers of the fiber-reinforced resin molded article (A) are continuous fibers.

11. The composite molded article according to claim 1, wherein the unsaturated carboxylic acid is a methacrylic acid.

* * * * *